United States Patent [19]
Matsuki et al.

[11] Patent Number: 5,634,444
[45] Date of Patent: Jun. 3, 1997

[54] INTAKE PORT STRUCTURE IN AN INTERNAL COMBUSTION ENGINE

[75] Inventors: Masato Matsuki; Hirosuke Niwa; Izumi Sugiyama, all of Saitama, Japan

[73] Assignee: Honda Giken Kogyo Kabushiki Kaisha, Tokyo, Japan

[21] Appl. No.: 429,959

[22] Filed: Apr. 27, 1995

[30] Foreign Application Priority Data

May 6, 1994 [JP] Japan .................................. 6-094148

[51] Int. Cl.$^6$ .................................................. F02B 31/00
[52] U.S. Cl. ................................... 123/306; 123/188.14
[58] Field of Search ................................ 123/306, 308, 123/188.14

[56] References Cited

U.S. PATENT DOCUMENTS

| | | | |
|---|---|---|---|
| 4,503,819 | 3/1985 | Okumura et al. | 123/188.14 |
| 4,530,325 | 7/1985 | Namba et al. | 123/188.14 |
| 4,884,539 | 12/1989 | Ciccarone et al. | 123/188.14 |
| 4,932,377 | 6/1990 | Lyle | 123/188.14 |
| 5,335,634 | 8/1994 | Hashimoto et al. | 123/308 |
| 5,417,190 | 5/1995 | Ando et al. | 123/308 |

FOREIGN PATENT DOCUMENTS

| | | | |
|---|---|---|---|
| 2248616 | 10/1990 | Japan . | |
| 2242226 | 9/1991 | United Kingdom | 123/306 |

*Primary Examiner*—Erick R. Solis
*Attorney, Agent, or Firm*—Lyon & Lyon LLP

[57] ABSTRACT

In an intake port structure in an internal combustion engine, an edge portion is formed on a lower surface of an intake port at a location immediately upstream of an intake bore 7. The angle θ formed by the center line L of the intake port with respect to a deck surface is set smaller than the angle θ formed by an exhaust valve seat provided in a pent roof of a combustion chamber with respect to the deck surface. Further, if the height of an apex of the pent roof of the combustion chamber is represented by $H_0$, and an intersection between an extension of the center line L of the intake port 5 and a straight vertical line $L_0$ passing through the apex of the pent roof of the combustion chamber to intersect the deck surface at a right angle is represented by P, the height H of the intersection P is set so that a relation, $H_0 > H > 2H_0/3$ is satisfied.

6 Claims, 4 Drawing Sheets

INTAKE PORT STRUCTURE IN AN INTERNAL COMBUSTION ENGINE

BACKGROUND OF THE INVENTION

1. Field of the Invention

The present invention relates to an intake port structure in an internal combustion engine, including: a combustion chamber, an intake port and an exhaust port which are formed in a cylinder head coupled to a deck surface of a cylinder block, an intake valve seat mounted between the intake port and the combustion chamber and opened and closed by an intake valve, and an exhaust valve seat mounted between the exhaust port and the combustion chamber and opened and closed by an exhaust valve.

2. Description of the Prior Art

If a swirl is generated in an air-fuel mixture drawn into the combustion chamber, the upper limit of engine speed with a lean burn of the air-fuel mixture is extended to improve the specific fuel consumption. The swirls include a lateral swirl and a vertical swirl. The lateral swirl is a flow of the air-fuel mixture drawn into the combustion chamber, which whirls about the axis of the cylinder. The vertical swirl is a flow of the air-fuel mixture drawn into the combustion chamber, which whirls along the wall surface of the combustion chamber, the wall surface of the cylinder and the top surface of the piston.

An intake port structure in which the wall surface of the combustion chamber connected to the intake valve seat for the intake valve is formed into a conical shape in order to generate such a vertical swirl, is conventionally known from Japanese patent Application Laid-open No. 248616/90.

In the above prior art structure, it is possible to generate the vertical swirl in the air-fuel mixture, but there is a problem that the amount of air-fuel mixture drawn is insufficient and as a result, a sufficient output is not obtained.

SUMMARY OF THE INVENTION

Accordingly, it is an object of the present invention to provide an intake port configuration in an internal combustion engine, in which an effective vertical swirl can be generated, while insuring a sufficient amount of air-fuel mixture drawn.

To achieve the above object, according to a first aspect and feature of the present invention, there is provided an intake port structure in an internal combustion engine, comprising: a combustion chamber, an intake port and an exhaust port which are formed in a cylinder head coupled to a deck surface of a cylinder block, an intake valve seat mounted between the intake port and the combustion chamber and opened and closed by an intake valve, and an exhaust valve seat mounted between the exhaust port and the combustion chamber and opened and closed by an exhaust valve, wherein the intake port is formed with an edge portion at an inner wall thereof on the side of the deck surface immediately upstream of the intake valve seat, an angle formed by a center line of the intake port with respect to the deck surface being set smaller than an angle formed by an end face of the exhaust valve seat with respect to the deck surface, and a distance H from the deck surface to an intersection between an extension of the center line of the intake port and a straight line passing through an apex of the combustion chamber to intersect the deck surface being set smaller than a distance $H_0$ from the deck surface to the apex of the combustion chamber.

With the first feature of the present invention, it is possible to insure a sufficient amount of air-fuel mixture will be drawn to provide an increased output, while improving the specific fuel consumption, by generating a powerful vertical swirl in the combustion chamber to extend the upper engine speed limit of lean burn of the air-fuel mixture.

According to a second aspect and feature of the present invention, in addition to the first feature, the distances H and $H_0$ are set so that a relation, $H_0 > H > 2H_0/3$ is satisfied.

With the second feature, the generation of the vertical swirl can effectively exist with the amount of air-fuel mixture drawn.

According to a third aspect and feature of the present invention, in addition to the first feature, the intake port structure further includes a smooth raised portion provided at a location upstream of the edge portion formed in the intake port.

With the third feature, it is possible to adjust the intensity of the vertical swirl to any value.

The above and other objects, features and advantages of the invention will become apparent from the following description of preferred embodiments taken in conjunction with the accompanying drawings.

DESCRIPTION OF THE PREFERRED EMBODIMENTS

The present invention will now be described by way of preferred embodiments in connection with the accompanying drawings.

A first embodiment of the present invention will be described below.

Figure 1:
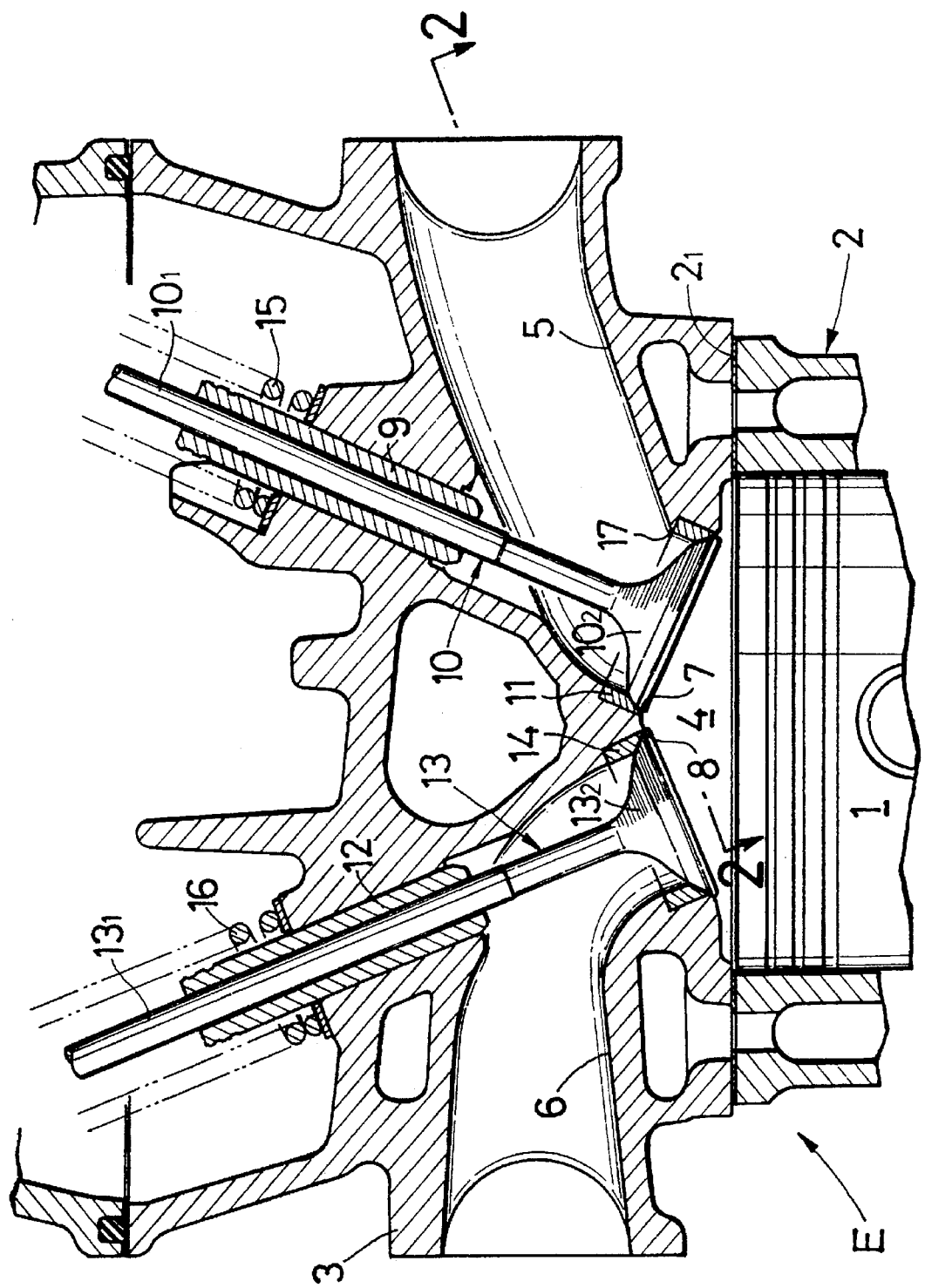
FIG. 1 is a vertical sectional view of a cylinder head area of an internal combustion chamber according to a first embodiment of the present invention.
Figure 2:
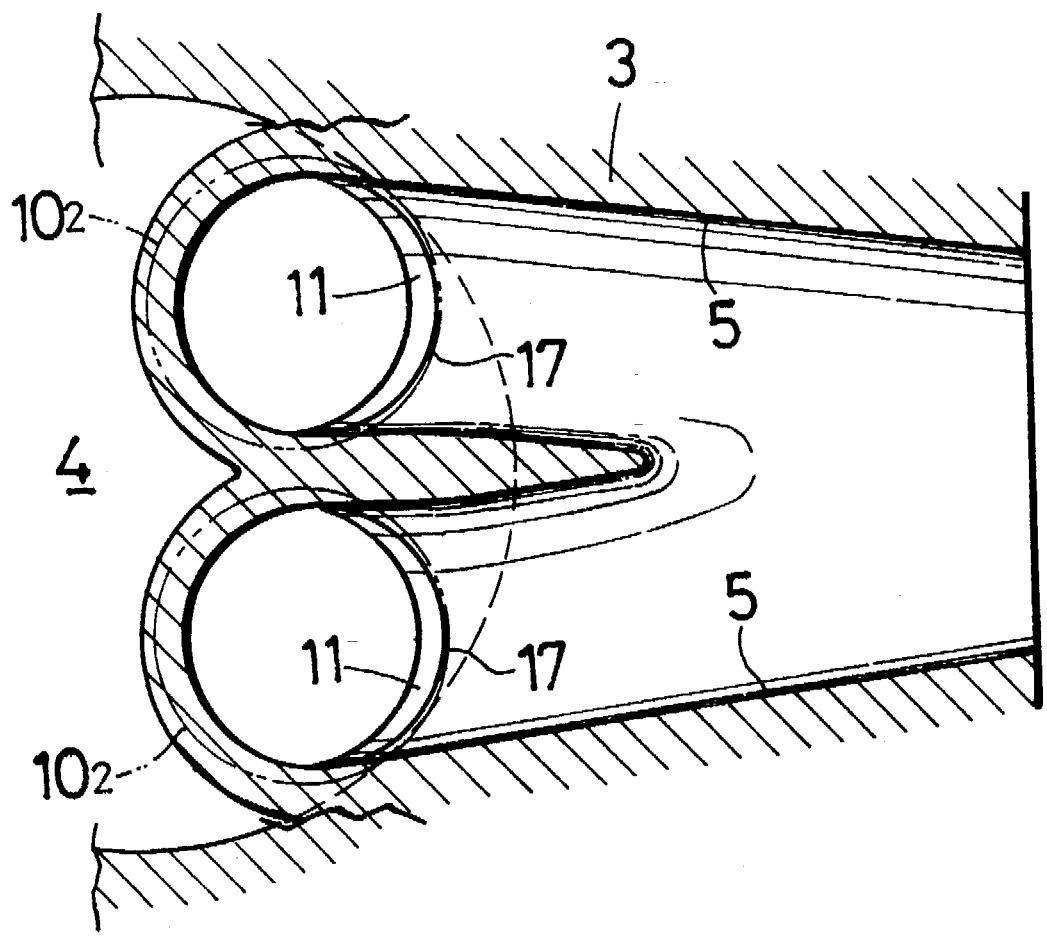
FIG. 2 is a sectional view taken along a line 2—2 in FIG. 1.

Referring to FIGS. 1 and 2, an internal combustion engine E includes a cylinder block 2 in which a piston 1 is slidably received. A cylinder head 3 has a mounting surface coupled to a deck surface $2_1$ of the cylinder block 2. A combustion chamber 4 defined in the cylinder head 3 is of a so-called pent roof type which is of an inverted V-shape and includes an intake-side flat roof surface and an exhaust side flat roof surface which surfaces intersect each other, so that a central portion is located at a higher level. A pair of intake ports 5 and a pair of exhaust ports 6 are defined in an opposed relation to each other in the cylinder head 3. The two intake ports 5 are the same and the two exhaust ports 6 are the same only one of each and their associated elements will be described. A downstream end of each intake port 5 opens into the combustion chamber 4 through an intake bore 7, while an upstream end of each exhaust port 6 opens into the combustion chamber 4 through an exhaust bore 8.

An intake valve 10 includes a valve stem $10_1$ which is slidably guided in a valve guide 9 mounted in the cylinder head 3, and a valve head $10_2$ which is capable of sitting on an intake valve seat 11 mounted in the intake bore 7. An exhaust valve 13 includes a valve stem $13_1$ which is slidably guided in a valve guide 12 mounted in the cylinder head 3, and a valve head $13_2$ which is capable of sitting on an exhaust valve seat 14 mounted in the exhaust bore 8. The intake and exhaust valves 10 and 13 are biased in closing directions by valve springs 15 and 16, respectively, and opened against resilient forces of the valve springs 15 and 16 by urging them by an intake cam and an exhaust cam (not shown), respectively. A lower surface of the intake valve seat 11 and a lower surface of the exhaust valve seat 14 are flush with the roof surface of the combustion chamber 4 in which they are mounted.

Figure 3:
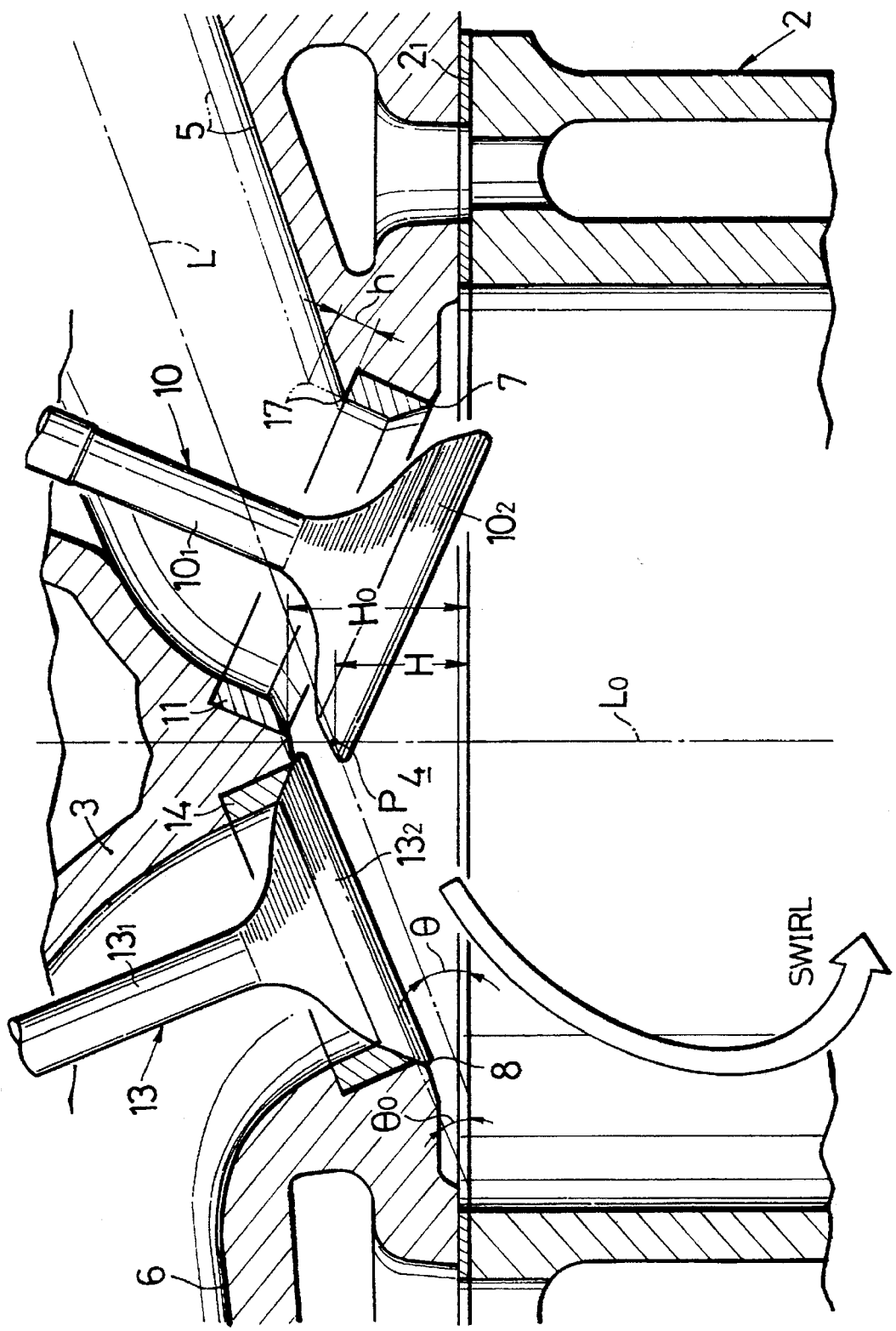
FIG. 3 is an enlarged view of an essential portion shown in FIG. 1.

As can be seen from a reference to FIGS. 1 and 2 along with FIG. 3, an arcuate edge portion 17 is formed on a lower surface (i.e., on the same side as the deck surface $2_1$) of the intake port 5 at a location immediately upstream of the intake bore 7. The arcuate edge portion 17 extends for only the lower portion of the circumference of the valve seat, i.e. less than 360°. In this embodiment, the location of the edge portion 17 is level with an upper surface of the intake valve seat 11, i.e., the height of the edge portion 17 as measured from the upper surface of the intake valve seat 11 is equal to zero (0). A swirl is produced in a flow along the lower surface of the intake port 5 due to the presence of the edge portion 17 and hence, a speed difference is produced between the flow along the lower surface of the intake port 5 and a flow of a high flow speed along the upper surface of the intake port 5. Thus, the intake air flow is deflected downwardly by the speed difference to effectively form a vertical swirl.

The angle $\theta$ formed by a center line L of the intake port 5 with respect to the deck surface $2_1$ is 20°, and the angle $\theta_0$ formed by the roof surface of the combustion chamber 4 on the side of the exhaust valve 13 with respect to the deck surface $2_1$ (i.e., the angle $\theta_0$ formed by the exhaust valve seat 14 and exhaust valve face with respect to the deck surface $2_1$) is set at 22° which is larger than the angle $\theta$. Thus, the flow along the upper surface of the intake port 5 is guided on the exhaust valve face and exhaust-side roof surface of the combustion chamber 4 and deflected downwardly to effectively form the vertical swirl.

Further, if an intersection between an extension of the center line L of the intake port 5 and a straight line $L_0$ passing through an apex of the combustion chamber 4 to intersect the deck surface $2_1$ at right angles is represented by P, the distance H from the deck surface $2_1$ to the intersection P is 11 mm and is set to be smaller than the distance $H_0$ (=14 mm) from the deck surface $2_1$ to the apex of the combustion chamber 4. This makes it possible to smoothly introduce air-fuel mixture through the intake port 5 into the combustion chamber 4 with a small flow path resistance to sufficiently insure an adequate amount of air-fuel mixture is drawn.

Table 1 shows the shapes of various portions and the characteristics in the embodiment, modifications 1 and 2 and comparative examples 1, 2 and 3. "$\theta$" in Table 1 is an angle formed by the center line L of the intake port 5 with respect to the deck surface $2_1$; H is a distance from the deck surface $2_1$ to the intersection P; h is a height of the edge portion 17 as measured from the upper surface of the intake valve seat 11; Ne limit is a limit number of the rate of revolutions per minute of the engine (an intake flow rate test); and T/R is a tumble ratio (an index representing an intensity of the vertical swirl).

TABLE 1

|  | Embodiment | Modification 1 | Modification 2 | Comparative example 1 | Comparative example 2 | Comparative example 3 |
| --- | --- | --- | --- | --- | --- | --- |
| θ | 20° | 20° | 20° | 12° | 17° | 29° |
| H | 1 mm | 12 mm | 13 mm | 23 mm | 15 mm | — |
| h | 0 mm | 1 mm | 2 mm | 9 mm | 4 mm | — |
| Ne limit | 5654 | 5750 | 5772 | 5620 | 5429 | — |
| T/R | 0.84 | 0.81 | 0.71 | 0.45 | 0.70 | 0.68 |

Wherein, $\theta_0=22°$, and $H_0=14$ mm.

The embodiment and the modifications 1 and 2 in Table 1 satisfy all of the following conditions (1) to (3).

(1) The edge portion 17 is provided on the lower surface of the intake port 5 at the location immediately upstream of the intake bore 7.

(2) $\theta<\theta_0$.

(3) $H_0>H>2H_0/3$.

Thus, both the limit number, Ne limit, of the revolutions rate of the engine and the tumble ratio T/R are good values (large values), thereby making it possible to extend the upper limit of lean burn of the air-fuel mixture, while maintaining a high engine output to improve the specific fuel consumption.

On the other hand, the value of h in the comparative example 1 is larger than those in the modifications 1 and 2, i.e., the edge portion 17 is provided far upstream from the intake bore 7, such as shown by dashed lines in FIG. 3. As a result, the condition (1) is not satisfied, and both the limit number, Ne limit, of the revolutions rate of the engine and the tumble ratio T/R are smaller than those in the embodiment and the modifications, resulting in a degraded performance. It is believed that this is because the swirl generated at the edge portion 17 is rectified again before reaching the intake bore 7 and hence, the difference in flow speed between the flows along the lower and upper surfaces of the intake port 5 is decreased. Further, in the comparative example 1, the condition (3) is not satisfied, because the value of H is larger than the value of $H_0$. This is also a primary cause of a reduction in performance.

In the comparative example 2, the condition (3) is not satisfied, because the value of H is larger than the value of $H_0$. As a result, the limit number, Ne limit, of the revolutions rate of the engine is decreased.

In the comparative example 3, the condition (2) is not satisfied, because the value of $\theta$ is larger than the value of $\theta_0$. As a result, the tumble ratio T/R is decreased.

In casting the cylinder head 2, the intake and exhaust ports 5 and 6 are shaped by cores. However, it has been experimentally confirmed that even if there are errors on the order of 1 mm in the location and the shape of the edge portion 17 due to the misalignment of the cores, there are not large changes in limit number, Ne limit, of the revolutions rate of the engine and in tumble ratio T/R. Therefore, the formation of the intake port 5 having the edge portion 17 in the present invention is easy even from the viewpoint of a production technique.

Figure 4:
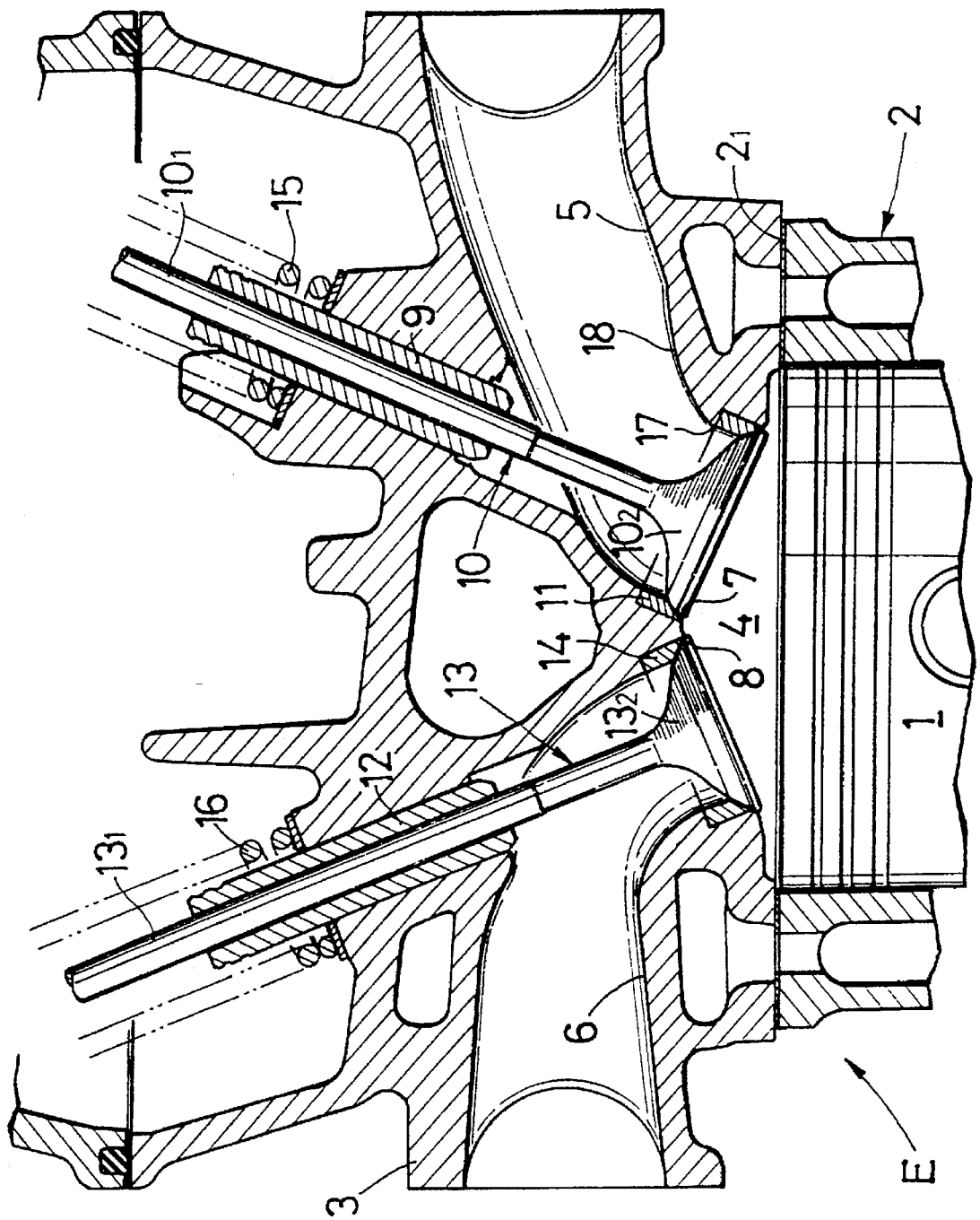
FIG. 4 is a view similar to FIG. 1, but illustrating a second embodiment of the present invention.

FIG. 4 illustrates a second embodiment of the present invention.

In the second embodiment, a smooth raised portion 18 is provided at a location upstream of the edge portion 17 formed in the intake port 5, and the other constructions are similar to those in the first embodiment.

The raised portion 18 weakens the function of the edge portion 17 for generating a swirl. If the height of the raised portion 18 is increased, the tumble ratio T/R is decreased. Therefore, it is possible to adjust the tumble ratio to any value by increasing or decreasing the height of the raised portion 18.

Although the embodiments of the present invention have been described in detail, it will be understood that the present invention is not limited to the above-described embodiments, and various modifications in design may be made without departing from the spirit and scope of the invention defined in the claims. For example, although the pent roof type combustion chamber 4 has been exemplified in the embodiments, the present invention is applicable to a semi-spherical combustion chamber. In this case, the angle $\theta_0$ is defined by an angle formed by the exhaust valve seat 14 with respect to the deck surface $2_1$. In addition, the present invention is applicable to an engine including a single intake valve or three or more intake valves in each of the cylinders.

What is claimed is:

1. An internal combustion engine, comprising: a penta roof combustion chamber, an intake port and an exhaust port which are formed in a cylinder head coupled to a deck surface of a cylinder block, an intake valve seat mounted between said intake port and said combustion chamber and opened and closed by an intake valve, and an exhaust valve seat mounted between said exhaust port and said combustion chamber and opened and closed by an exhaust valve, wherein said intake port is formed with an edge portion at an inner wall thereof on the side of said deck surface immediately upstream of said intake valve seat, an angle formed by a center line of said intake port with respect to said deck surface being set smaller than an angle formed by an end face of said exhaust valve seat with respect to said deck surface, and a distance H from said deck surface to an intersection between an extension of the center line of said intake port and a straight line passing through an apex of said penta roof combustion chamber to intersect said deck surface at a right angle being set smaller than a distance $H_0$ from said deck surface to the apex of said penta roof combustion chamber, wherein said distances H and $H_0$ are set such that a relation, $H_0 > H > 2H_0/3$ is satisfied.

2. An internal combustion engine according to claim 1, further including a smooth raised portion provided at a location upstream of said edge portion formed in said intake port.

3. An internal combustion engine according to claim 1, wherein said intake valve seat has a seat surface for receiving said intake valve, said seat surface being formed divergent toward said combustion chamber such that an upper side portion of said seat surface extends substantially parallel with an end face of said exhaust valve seat exposed to said combustion chamber.

4. An internal combustion engine according to claim 2, wherein said smooth raised portion is connected to a further upstream portion of the intake port via a depressed portion.

5. An internal combustion engine having a cylinder head with a mounting surface, a combustion chamber, an intake port, an exhaust port, an intake valve seat mounted in said intake port at said combustion chamber, and an exhaust valve seat mounted in said exhaust port at said combustion chamber, wherein said intake port has an edge portion at an inner wall on a lower side immediately adjacent and upstream of said intake valve seat, an angle formed by a center line of said intake port with respect to said mounting surface being smaller than an angle formed by an end face of said exhaust valve seat with respect to said mounting surface, an extension of the center line of said intake port passing below an apex of said combustion chamber at a center of said combustion chamber and a distance H from said mounting surface to an intersection between an extension of the center line of said intake port and a straight line passing through said apex of said combustion chamber to intersect said deck surface at a right angle being related to a distance $H_0$ from said deck surface to the apex of said combustion chamber such that $H_0 > H > 2H_0/3$.

6. An internal combustion engine having an overhead valve cylinder head with a combustion chamber, an intake port, an exhaust port, an intake valve seat in said intake port at said combustion chamber, and an exhaust valve seat mounted in said exhaust port at said combustion chamber wherein said intake port having a lower edge portion effective for causing vertical swirl in the combustion chamber, an angle formed between a center line of said intake port and an end face of said exhaust valve seat in a manner also effective for causing said vertical swirl, the center line of said intake port being oriented with respect to a roof of the combustion chamber in a manner also effective for causing said vertical swirl, and a distance H perpendicularly from deck surface of said cylinder head to an intersection between an extension of the center line of said intake port and a straight line passing through an apex of said combustion chamber to intersect said deck surface being related to a distance $H_0$ perpendicular from said deck surface to the apex of said combustion chamber such that $H_0 > H > 2H_0/3$.

* * * * *

UNITED STATES PATENT AND TRADEMARK OFFICE
CERTIFICATE OF CORRECTION

PATENT NO. : 5,634,444
DATED : June 3, 1997
INVENTOR(S) : M. Matsuki et al.

It is certified that error appears in the above-identified patent and that said Letters Patent is hereby corrected as shown below:

In the Abstract:

Line 6, before "formed by an" delete "$\theta$" and insert -- $\theta_o$ --.

Signed and Sealed this

Twenty-second Day of September, 1998

Attest:

BRUCE LEHMAN

Attesting Officer

Commissioner of Patents and Trademarks